(12) United States Patent
Wu et al.

(10) Patent No.: US 11,754,889 B2
(45) Date of Patent: *Sep. 12, 2023

(54) DISPLAY DEVICE

(71) Applicant: AU OPTRONICS CORPORATION, Hsin-Chu (TW)

(72) Inventors: Chia-Hao Wu, Hsin-Chu (TW); Han-Ping Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,068

(22) Filed: Oct. 21, 2021

(65) Prior Publication Data
US 2022/0100020 A1 Mar. 31, 2022

Related U.S. Application Data

(63) Continuation of application No. 16/904,969, filed on Jun. 18, 2020, now Pat. No. 11,156,881.

(30) Foreign Application Priority Data

Jul. 26, 2019 (TW) ................................. 108126579
Sep. 11, 2019 (TW) ................................. 108132882

(51) Int. Cl.
*G02F 1/1345* (2006.01)
*G02F 1/1333* (2006.01)
*G02F 1/13357* (2006.01)
*H01R 35/02* (2006.01)
*H05K 5/00* (2006.01)

(52) U.S. Cl.
CPC .... *G02F 1/13452* (2013.01); *G02F 1/133308* (2013.01); *G02F 1/133603* (2013.01); *H01R 35/02* (2013.01); *H05K 5/0017* (2013.01)

(58) Field of Classification Search
CPC .......... G02F 1/13452; G02F 1/133308; G02F 1/133603; G02F 1/133615; H01R 135/02; H05K 5/0017
See application file for complete search history.

(56) References Cited

U.S. PATENT DOCUMENTS

2002/0126248 A1\* 9/2002 Yoshida .............. G02F 1/13452
349/149
2007/0079537 A1\* 4/2007 Lee .................... G02F 1/133308
40/750
2008/0143918 A1\* 6/2008 Kim .................. G02F 1/133608
362/362

(Continued)

*Primary Examiner* — Zheng Song
(74) *Attorney, Agent, or Firm* — WPAT, P.C (57) ABSTRACT

A display device includes a display panel, a circuit connection module, and a supporting block. The display panel has a first end and a bottom surface. The circuit connection module has a connecting end, a circuit bearing portion, and a bending section between the connecting end and the circuit bearing portion. The connecting end is connected to the display panel at the first end while the bending section bends to make the circuit bearing portion connect to the bottom surface near the first end. The supporting block is arranged with the circuit bearing portion in an extending direction of the first end, and are at least partially connected to the portion of the bottom surface near the first end.

26 Claims, 9 Drawing Sheets

(56) References Cited

U.S. PATENT DOCUMENTS

| | | | | |
|---|---|---|---|---|
| 2009/0310057 A1* | 12/2009 | Kang | ............... | G02F 1/13452 |
| | | | | 349/58 |
| 2010/0118225 A1* | 5/2010 | Lee | ............... | G02B 6/0068 |
| | | | | 445/24 |
| 2013/0258702 A1* | 10/2013 | Kim | ............... | G02B 6/0091 |
| | | | | 362/602 |
| 2014/0063415 A1* | 3/2014 | Oohira | ............... | G02B 6/0068 |
| | | | | 349/65 |
| 2014/0112019 A1* | 4/2014 | Baek | ............... | G02B 6/0083 |
| | | | | 362/613 |
| 2014/0285982 A1* | 9/2014 | Kim | ............... | H05K 1/028 |
| | | | | 361/749 |
| 2014/0307396 A1* | 10/2014 | Lee | ............... | G02F 1/133305 |
| | | | | 29/830 |
| 2015/0098043 A1* | 4/2015 | Matsumoto | ............... | G02B 6/009 |
| | | | | 349/65 |
| 2018/0113342 A1* | 4/2018 | Ueno | ............... | G02F 1/1345 |
| 2020/0292860 A1* | 9/2020 | Chien | ............... | G02F 1/133308 |

* cited by examiner

DISPLAY DEVICE

BACKGROUND OF THE INVENTION

1. Field of the Invention

The invention generally relates to a display device. Particularly, the invention relates to a display device whose thickness is reduced.

2. Description of the Prior Art

In recent years, various display devices have been widely used in our lives. For example, devices such as televisions, computers, mobile phones, video game consoles, and automotive devices all contain display devices. In the development of display device technology, the trend continues to move towards large display area, narrow bezels or even no bezels in order to bring people a better visual experience.

Traditionally, an external control circuit board connected to the display panel is usually disposed at the bottom of the display device. However, in the pursuit of narrow bezels or frameless display device design solutions, the width of the outer frame of the device system must be reduced over and over again in order to achieve better visual effects. Some designs fold the external control circuit board to the back of the backlight module of the display device to reduce the width of the bottom frame of the display device. Nevertheless, the folding of the control circuit board to the back of the backlight module increases the overall thickness of the display device, and hence it still cannot meet the requirement of thin design.

SUMMARY OF THE INVENTION

It is an object of the invention to provide a display device whose thickness is reduced.

It is another object of the invention to provide a display device whose display panel is less likely to be broken.

The display device includes a display panel, a circuit connection module, and a supporting block. The display panel has a first end and a bottom surface. The circuit connection module has a connecting end, a circuit bearing portion, and a bending section between the connecting end and the circuit bearing portion. The connecting end is connected to the display panel at the first end while the bending section bends to make the circuit bearing portion be at least partially connected to the portion of the bottom surface near the first end. The supporting block is arranged at a side of the circuit bearing portion in an extending direction of the first end, and is at least partially connected to the portion of the bottom surface near the first end.

With the aforementioned arrangement, the thickness of the display device can be reduced since the circuit bearing portion does not need to be overlapped with the backlight module. The supporting block can provide supporting force for the display panel. Consequently, when the portion of the display panel near the first end suffers an external force, the supporting block can support the display panel to resist bending. Additionally, the supporting block can also keep the sides of the display device from colliding.

DETAILED DESCRIPTION OF THE PREFERRED EMBODIMENT

The following describes the implementation of the connection assembly disclosed by the present invention through specific embodiments and drawings. Those skilled in the art can understand the advantages and effects of the present invention from the content disclosed in this specification. However, the contents shown in the following sentences never limit the scope of the present disclosure. Without departing from the conception principles of the present invention, a person having ordinary skill in the present art may realize the present disclosure through other embodiments based on different views and applications. In the attached FIGS, for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On the other hand, when an element is described as "directly existing on another element" or "being directly connected to" another element, there is no element therebetween. As used in the present specification, a "connection" may be a physical and/or electrical connection. In addition, an "electrical connection" or "coupling" means that other elements may exist therebetween.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

In addition, relative terms such as "lower" or "bottom" and "on" or "top" may be used to describe the relationship between an element and another element in the present specification, as shown in the FIGS. It should be understood that, the purpose of using relative terms is to include the different directions of the devices not shown in the FIGS. For example, if a device in an attached FIG. is turned upside down, an element described as being "under" another element will be "on top of" that element. Therefore, a descriptive term "under" may include the meaning of both "under" and "on top of", depending on the specific orientation of the attached FIG.

The terms "about", "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10%, ±5%. In addition, "about", "approximate" or "essentially" used in the present specification may select a more acceptable range of deviation or standard deviation based on optical property, etching property or other properties. One cannot apply one standard deviation to all properties.

The invention provides a display device. The display device can be a non-self-emissive display device or a self-emissive display device. The non-self-emissive display device can be, for example, a liquid crystal display (LCD) device, an electrophoretic display device, a reflective display device, a transflective display device, etc. The self-emissive display device can be, for example, an organic light emitting diodes (OLEDs) display device, a micro-light emitting diodes (Micro LEDs) display device, etc.

Figure 1:
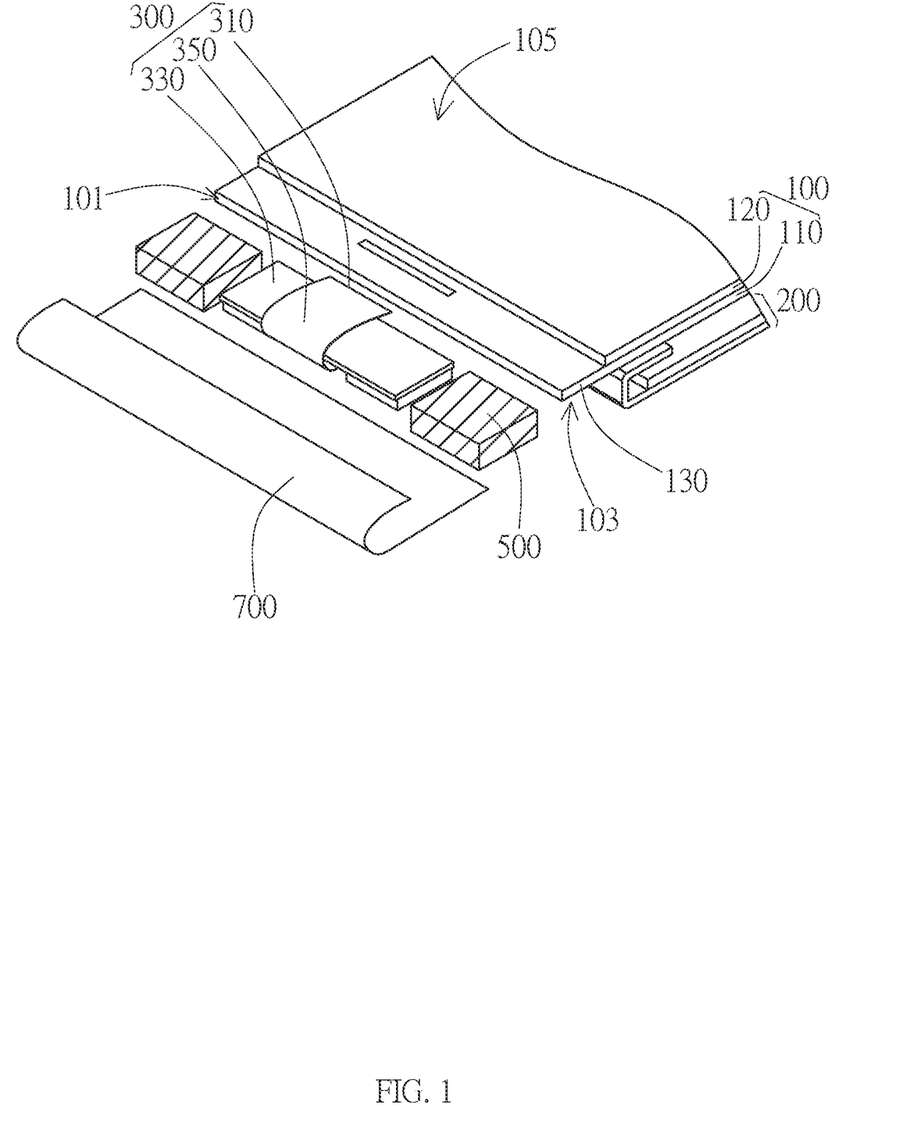
FIG. 1 is an exploded view of the components of an embodiment of a display device.
Figure 2A:
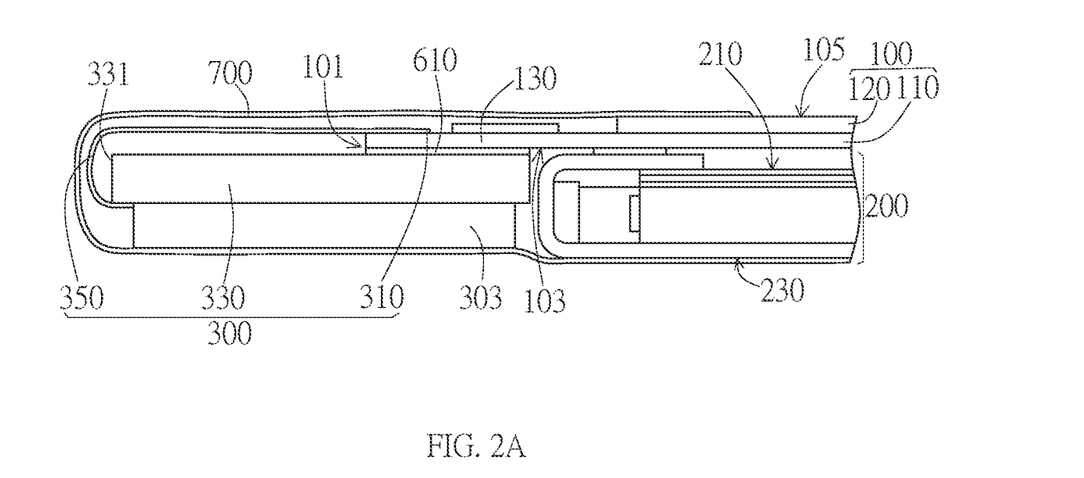
FIG. 2A is a section view of an embodiment of a display device.

FIG. 1 is an exploded view of the components of an embodiment of a display device. As shown in FIG. 1, a display device includes a display panel 100, a circuit connection module 300, and a supporting block 500. In this embodiment, the display panel 100 is a liquid crystal display panel and a backlight module 200 is provided thereunder, but not limited thereto, it may be a self-emissive display panel or a panel having other display modes. As shown in FIG. 1, the display panel 100 has a first end 101 and a bottom surface 103. Particularly, the display panel 100 includes a first substrate 110 and a second substrate 120 in this embodiment. The first substrate 110 is, for example, a pixel circuit substrate on which pixel electrodes and routes are disposed. The second substrate 120 is stacked on the first substrate 110, and there may be a liquid crystal layer or other elements with different properties therebetween according to the type of the display mode. In this embodiment, the second substrate 120 may be, for example, a color filter layer substrate, and a color filter layer is disposed thereon and corresponds to each pixel unit on the first substrate 110. As shown in FIG. 1 and FIG. 2A, at the position of the first end 101 of the display panel 100, the first substrate 110 protrudes from the second substrate 120 with a protruding portion 130. In other words, the first substrate 110 and the second substrate 120 are not aligned with each other at the first end 101, and the first substrate 110 is relatively prominent, but not limited thereto.

As shown in FIG. 1 and FIG. 2A, the connecting end 310 of the circuit connection module 300 is connected to the first end 101 of the display panel 100. For example, the connecting end 310 of the circuit connection module 300 can be connected to the surface of the protruding portion 130 and electrically connected to the circuit thereon. The circuit connection module 300 further includes a circuit bearing portion 330 and a bending section 350. In this embodiment, the circuit bearing portion 330 is a printed circuit board (PCB), and the bending section 350 is a flexible printed circuit (FPC). One end of the bending section 350 is connected to the circuit bearing portion 330, and the other end is formed as a connecting end 310. However, in different embodiments, the circuit bearing portion 330 and the bending section 350 can be made in one piece by cutting a FPC or by other methods. The components 303 such as a driving circuit, a control circuit, and/or a connection line are disposed on the circuit bearing portion 330, which can be electrically connected to the display panel 100 through the lines on the bending section 350.

As shown in FIG. 2A, the bending section 350, for example, is bent around the extending direction of the first end 101 so that the circuit bearing portion 330 and the connecting end 310 are located on opposite sides of the display panel 100. Particularly, the circuit bearing portion 330 is connected to at least a portion of the bottom surface 103 near the first end 101. As shown in FIG. 2A, the circuit bearing portion 330 is connected to the bottom surface 103 of the protruding portion 130, but not limited thereto. Furthermore, in this embodiment, the circuit bearing portion 330, for example, may protrude beyond the first end 101 and have a first lateral end 331 away from the first end 101. In other words, the circuit bearing portion 330 only partially overlaps the bottom surface 103, but is not limited thereto. As shown in FIG. 2A, the circuit bearing portion 330 is connected to the bottom surface 103 via a first adhesive layer 610; that is, the first adhesive layer 610 is disposed between the circuit bearing portion 330 and the bottom surface 103 so that the circuit bearing portion 330 is bonded to the bottom surface 103. However, in different embodiments, the circuit bearing portion 330 may be connected to the bottom surface 103 in other ways. The thickness of the entire display device can be reduced with this arrangement.

As shown in FIG. 2A, the backlight module 200 which has a luminous surface 210 and a back surface 230 opposite to each other is also provided, wherein the luminous surface 210 faces the bottom surface 103. The portion of the bottom surface 103 near the first end 101 protrudes from the backlight module 200, and the circuit bearing portion 330 is connected to the portion of the bottom surface 103 protruding from the backlight module 200; consequently, the circuit bearing portion 330 is side by side with the backlight module 200 in the section view shown in FIG. 2A. In this embodiment, in the direction perpendicular to the bottom surface 103, the back surface 230 of the backlight module 200 slightly protrudes from the circuit bearing portion 330; that is, the back surface 230 is further away from the bottom surface 103. Nonetheless, the circuit bearing portion 330 may be flush with the back surface 230 or protrude from the back surface 230.

Additionally, as shown in FIG. 2A, a tape 700 may be provided to cover the outside of the circuit connection module 300. In this embodiment, one end of the tape 700 is attached to the display panel 100, for example, attached to the display surface 105; the other end is attached to the back surface 230 of the backlight module 200, bypassing the outside of the circuit connection module 300.

Figure 2B:
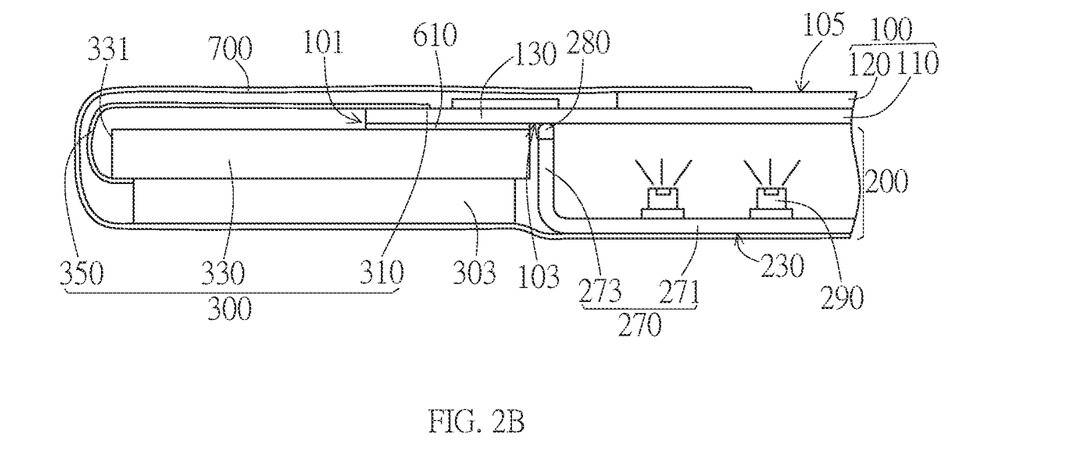
FIG. 2B is a section view of a variant embodiment of a display device.

In the embodiment shown in FIG. 2A, the backlight module 200 may be a side-type backlight module including, for example, a light guide plate, an optical film, or a reflective sheet. However, it may also be a direct-type backlight module in different embodiments. As shown in FIG. 2B, the backlight module 200 has a back plate 270, a pad 280, and a plurality of light sources 290. The back plate 270 is composed of a bearing plate 271 and a side wall 273 at least partially disposed around the bearing plate 271, wherein the bottom surface 103 of the display panel 100 is supported by the top of the side wall 273. The pad 280 is disposed between the top of the side wall 273 and the bottom surface 103; it preferably maybe made of rubber or other plastic materials. In this embodiment, the back plate 270 is made of metal, but is not limited thereto. The light sources 290 may be, for example, light emitting diodes, which are arranged on the bearing plate 271 to form direct-type light sources.

Figure 2C:
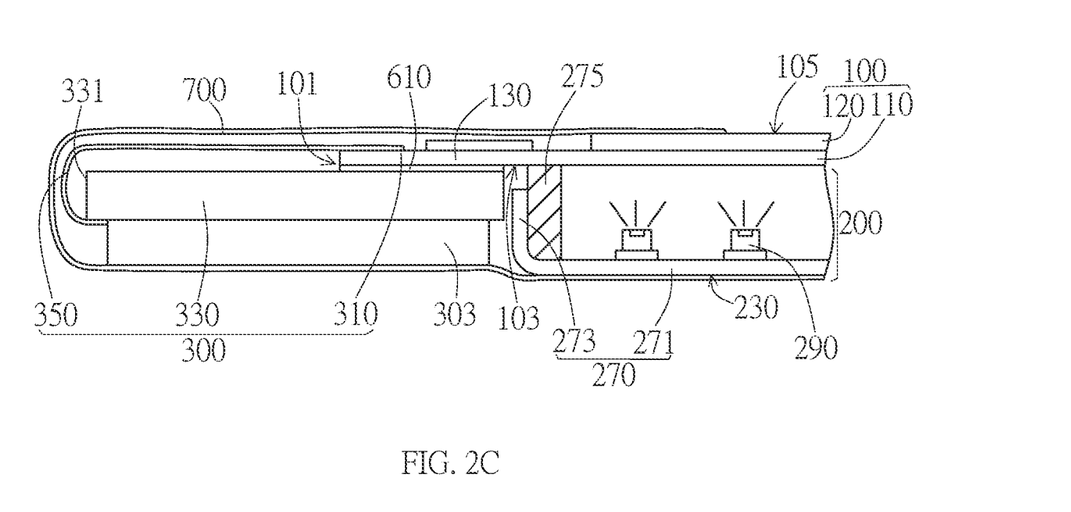
FIG. 2C is a section view of a variant embodiment of a display device.
Figure 2D:
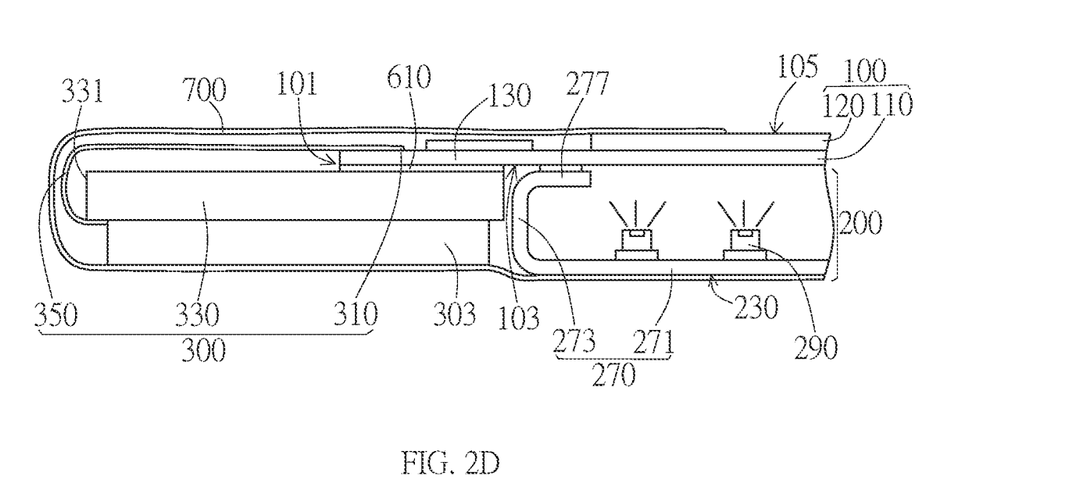
FIG. 2D is a section view of a variant embodiment of a display device.

In the embodiment shown in FIG. 2C, a frame 275 can be disposed on the back plate 270, and then the display panel 100 can be supported by the frame 275. Moreover, in the embodiment shown in FIG. 2D, the top of the side wall 273 is bent toward the center of the backlight module 200 to form a platform 277, and the bottom surface 103 of the display panel 100 is disposed on the platform 277.

Figure 3:
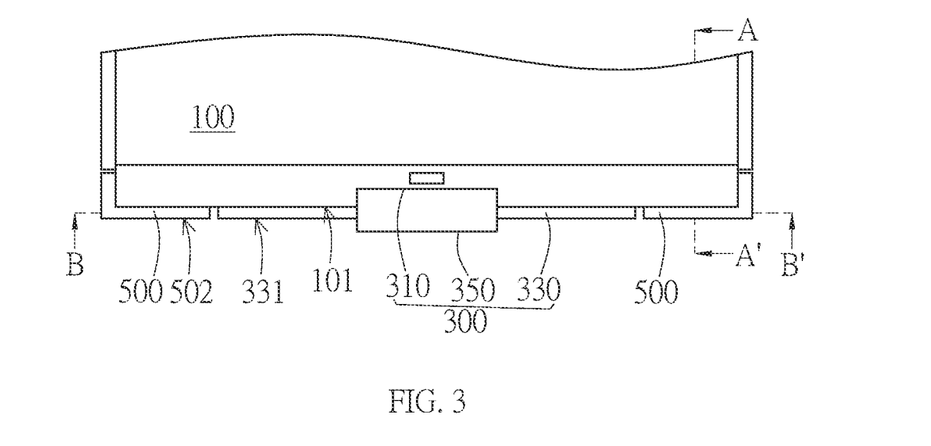
FIG. 3 is a top view of an embodiment of a display device.

As shown in FIG. 1, FIG. 3 to FIG. 4B, the supporting block 500 is arranged with the circuit bearing portion 330 in an extending direction of the first end 101, and is at least partially connected to the portion of the bottom surface 103 near the first end 101. On a projection plane parallel to the bottom surface 103, the supporting block 500 and the circuit bearing portion 330 are not overlapped with each other. As shown in FIG. 3, the supporting block 500 is disposed on one side of the circuit bearing portion 330. In an embodiment, the circuit bearing portion 330 may be closer to the middle portion of the first end 101, and the supporting block 500 may be closer to the corner of the first end 101. In addition, the range of placement of the circuit bearing portion 330 and the supporting block 500 substantially covers the entire length of the first end 101, but is not limited thereto. In this embodiment, the supporting blocks 500 are respectively disposed on both sides of the circuit bearing portion 330, but a single supporting block 500 may also be disposed on one side of the circuit bearing portion 330. With the placement of the supporting block 500, when the portion of the display panel 100 near the first end 101 where a circuit connection module 300 is not provided is subject to external force, the supporting block 500 can provide a supporting force from the back side to reduce the risk of damage.

The supporting block 500 may be made of, for example, plastic such as polycarbonate (PC) or acrylonitrile-butadiene-styrene (ABS) copolymer, or other materials, which may have, for example, no less than 2 GPa's Young's modulus. With this design, the supporting block 500 can provide more sufficient supporting force to support the display panel 100 so that it will not be easily broken due to bending.

Figure 4A:
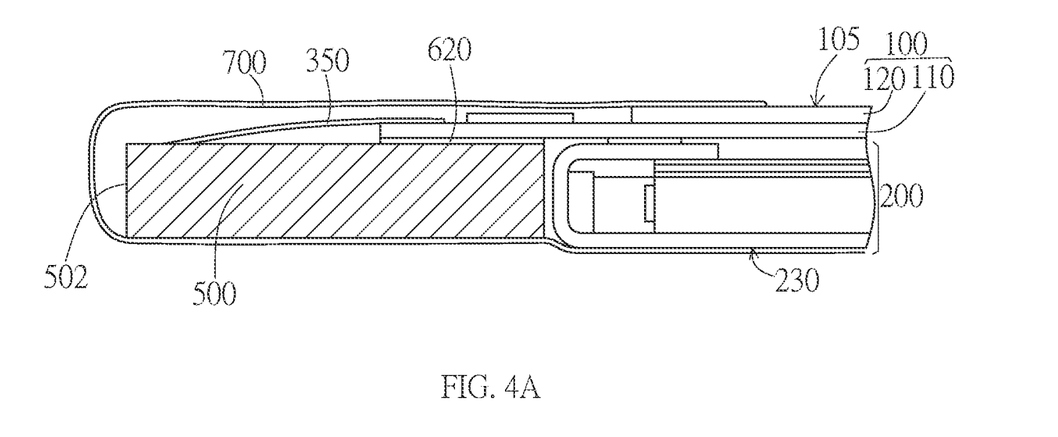
FIG. 4A is a section view of an embodiment of a display device.
Figure 4B:
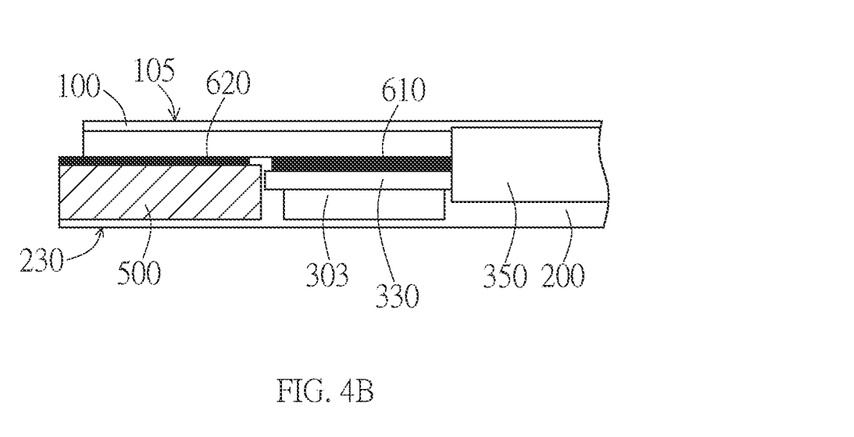
FIG. 4B is a section view of another direction of an embodiment of a display device.

FIG. 4A is a schematic view along the A-A' section of the embodiment shown in FIG. 3; FIG. 4B is a schematic view along the B-B' section of the embodiment shown in FIG. 3. As shown in FIG. 4A and FIG. 4B, in this embodiment, the back surface 230 of the backlight module 200 protrudes slightly from the supporting block 500; nevertheless, the supporting block 500 can also be flush with the back surface 230. Additionally, as shown in FIG. 4A, the supporting block 500 is connected to the bottom surface 103 via a second adhesive layer 620; that is, the second adhesive layer 620 is disposed between the supporting block 500 and the bottom surface 103 so that the supporting block 500 and the bottom surface 103 are bonded together. However, in different embodiments, the supporting block 500 may be connected to the bottom surface 103 in other ways. As also shown in FIG. 4A, the thickness of the first adhesive layer 610 and the second adhesive layer 620 may be different, so as to adjust the height of the supporting block 500 and the bottom of the circuit bearing portion 330.

Figure 5:
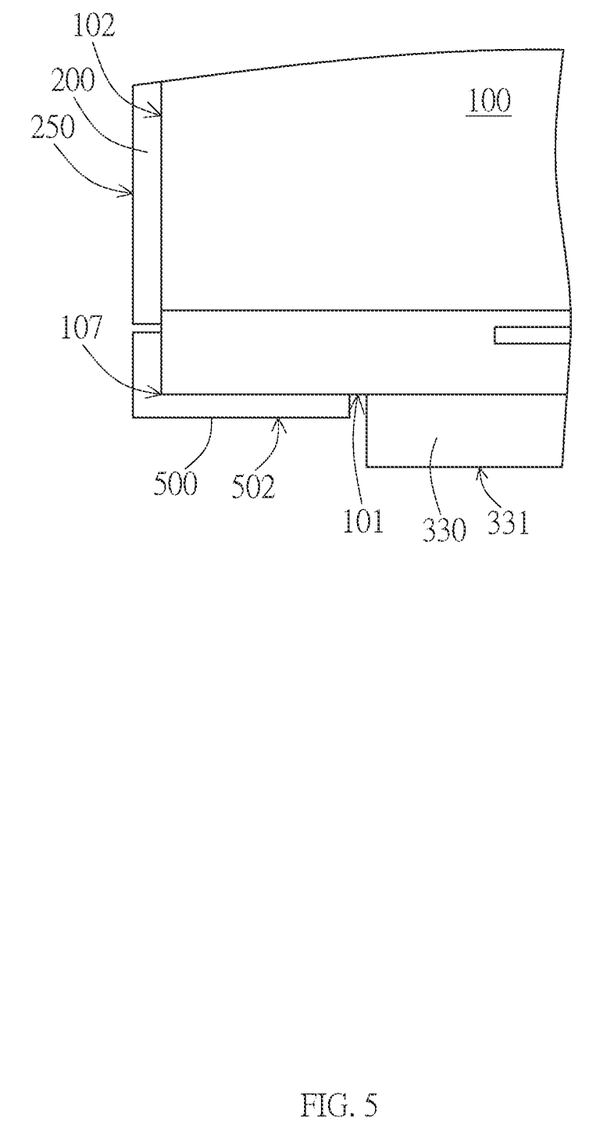
FIG. 5 is a top view of a variant embodiment of a display device.

In the embodiment shown in FIG. 3, the support block 500, for example, may at least partially protrude beyond the first end 101 and have a second lateral end 502 away from the first end 101. In other words, the circuit bearing portion 330 only partially overlaps the bottom surface 103, but is not limited thereto. As shown in the embodiment of FIG. 3, the first lateral end 331 of the circuit bearing portion 330 may be flush with the second lateral end 502 of the supporting block 500. However, in different embodiments, as shown in FIG. 5, the first lateral end 331 may protrude from the second lateral end 502; that is, the supporting block 500 is more recessed than the circuit bearing portion 330. When the product is assembled, the space vacated by recessing the supporting block 500 can be used for disposing other mechanisms, such as a hinge for assembling with a system case, and the like.

Furthermore, as shown in FIG. 5, the display panel 100 has a second end 102. The second end 102 may be, for example, perpendicular to the first end 101 and in contact with the first end 101 to form a corner 107. In this embodiment, the supporting block 500 protrudes at least partially beyond the second end 102 and the corner 107 to reduce the chance of the corner 107 being hit. Moreover, as shown in FIG. 5, the backlight module 200 and the side 250 on the side of the second end 102 also protrude beyond the second end 102. The supporting block 500 is preferably flush with the side 250, but not limited thereto. With this arrangement, it is possible to have a smooth product appearance and protect the display panel 100 at the same time.

Figure 6:
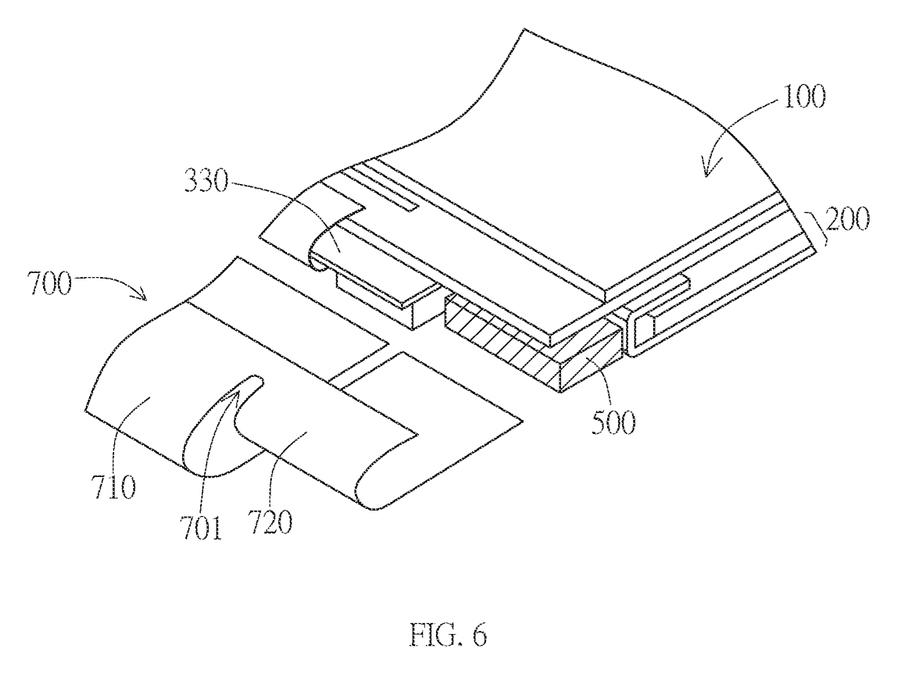
FIG. 6 is an exploded view of the components of another embodiment of a display device.

As shown in FIG. 6, in this embodiment, since the circuit connection module 300 protrudes from the supporting block 500, the tape 700 therefore has a first wrapping portion 710 and a second wrapping portion 720 which correspond to the circuit connection module 300 and the supporting block 500 respectively. The first wrapping portion 710 and the second wrapping portion 720 are also arranged along the extending direction of the first end 101, and a crack exists therebetween. As shown in FIG. 6, the crack 701 only cuts part of the tape 700, therefore the first wrapping portion 710 and the second wrapping portion 720 can still be connected via the uncut part. With this arrangement, the first wrapping portion 710 and the second wrapping portion 720 can be bent at different positions to respectively wrap the circuit connection module 300 and the supporting block 500 with different protruding lengths.

Figure 7:
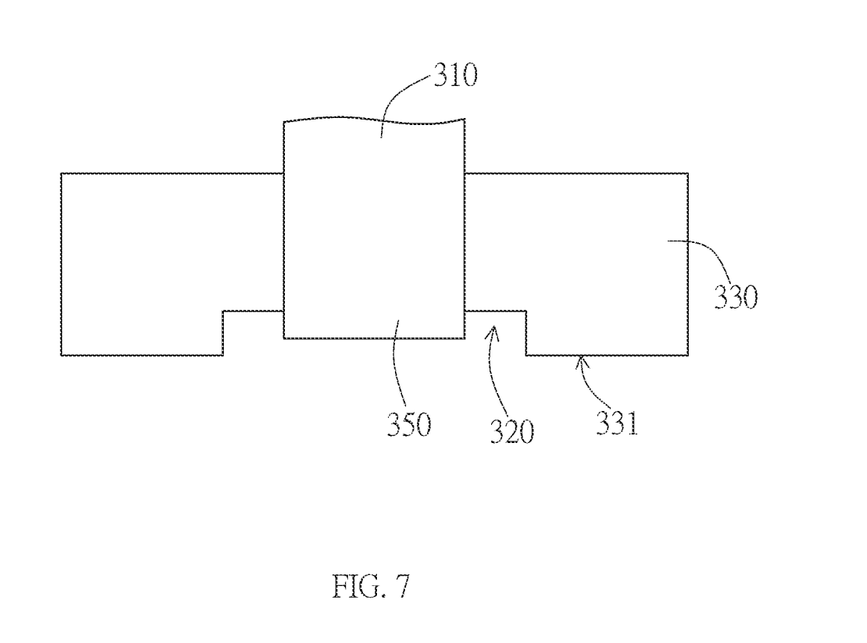
FIG. 7 is a schematic diagram of another embodiment of a circuit connection module.

In the embodiment shown in FIG. 7, the circuit bearing portion 330 is a printed circuit board, and has a first lateral end 331. The bending section 350 is formed with a recessed portion 320 on the first lateral end 331, wherein one end of the bending section 350 is connected to the circuit bearing portion 330 and is partially located in the recessed portion 320. Since the bending section 350 itself is also elastic, a certain amount of space is needed for bending, so as to reduce the damage to the lines distributed on it due to a small bending radius. With this arrangement, there may be more space to accommodate the bending section 350 after it is bent, without having too small of a bending radius of the bending section 350 for the purpose of reducing its volume after bending.

Figure 8A:
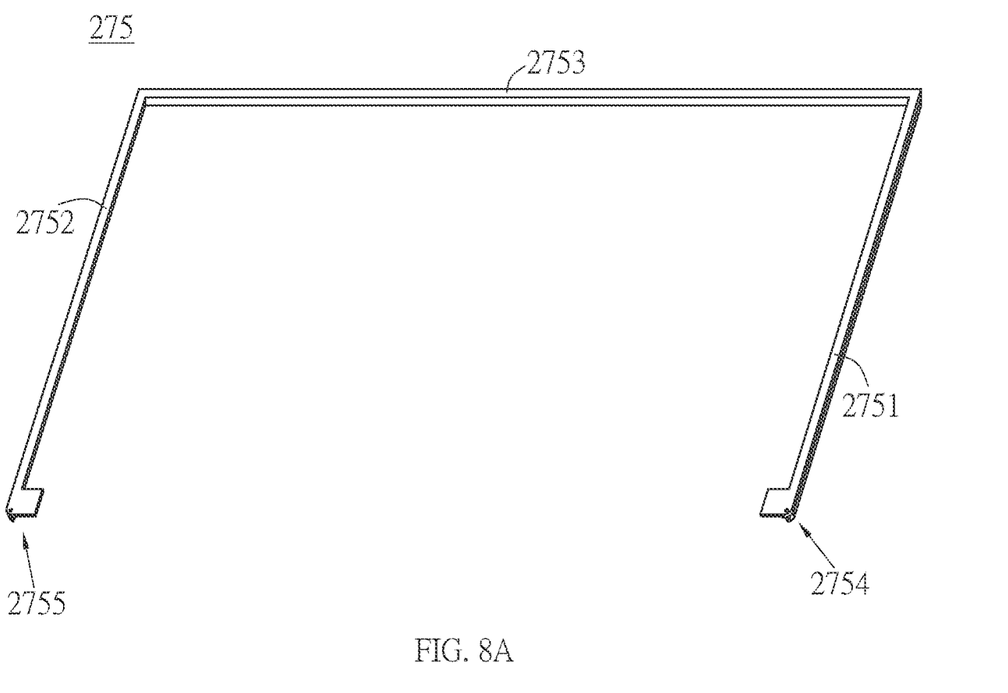
FIG. 8A is a schematic diagram of a frame of an embodiment of a display deice.
Figure 8B:
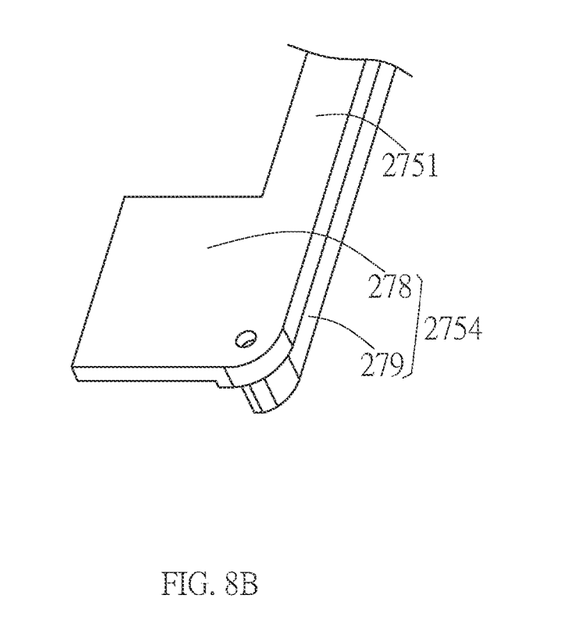
FIG. 8B is an enlarged view of a part of the frame of the embodiment in FIG. 8A.

In an embodiment of the invention, the display device can also include a frame; the frame is disposed around the backlight module, and can provide support for the display panel. As shown in FIG. 8A, the frame 275 includes a first arm 2751, a second arm 2752 and a third arm 2753, wherein two ends of the third arm 2753 are respectively connected to one end of the first arm 2751 and one end of the second arm 2752. At the opposite end to the third arm 2753, the first arm 2751 and the second arm 2752 respectively include a first free end 2754 and a second free end 2755 that extend to the first end 101 (not shown). In other words, the first arm 2751, the second arm 2752 and the third arm 2753 together form a semi-open area for accommodating the backlight module, and the opening of the semi-open area corresponds to the first end 101. FIG. 8B is a partially enlarged perspective view of the first arm 2751 shown in FIG. 8A. As shown in FIG. 8B, the first free end 2754 includes a wall 279 and a frame roof plate 278 located at the top of the wall 279. The second free end 2755 preferably also includes the wall 279 and the frame roof plate 278 located at the top of the wall 279, and has a structure (not shown) symmetrical to the first free end 2754, but not limited thereto.

Figure 9A:
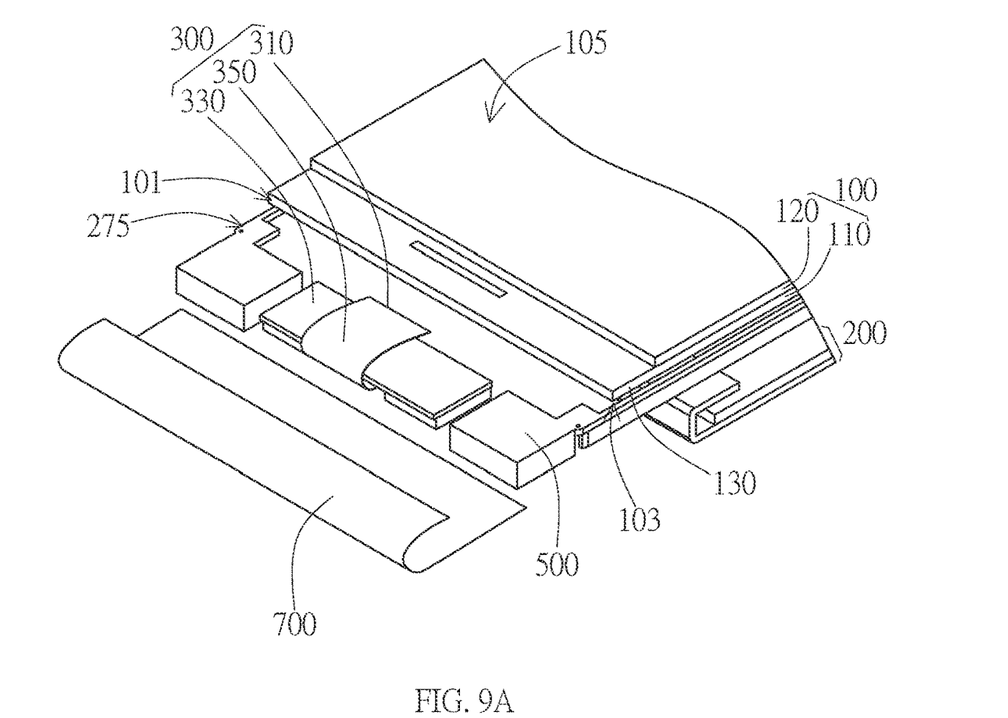
FIG. 9A is an exploded view of components of another embodiment of a display deice.
Figure 9B:
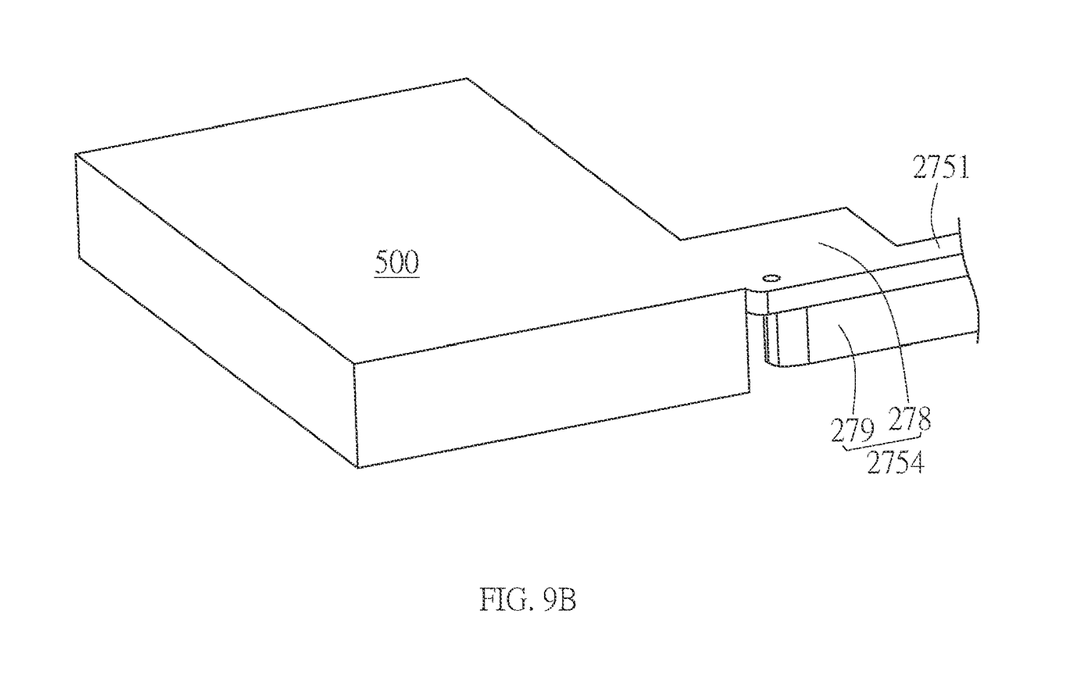
FIG. 9B is an enlarged view of a part of the frame of the embodiment in FIG. 8A.

In another embodiment, as show in FIG. 9A, the display device includes a display panel 100, a circuit connection module 300, a frame 275 and a supporting block 500. The frame 275 has a first arm 2751, a second arm 2752 and a third arm 2753. The first arm 2751 and the second arm 2752 respectively include a first free end 2754 and a second free end 2755 that extend to the first end 101 (not shown). FIG. 9B is a partially enlarged perspective view of the first arm 2751 shown in FIG. 9A. As shown in FIG. 9B, the first free end 2754 includes a wall 279 and a frame roof plate 278 located at the top of the wall 279. The second free end 2755 may include a structure (not shown) symmetrical to the first free end 2754, but not limited thereto. As shown in FIG. 9B, in this embodiment, the frame roof plate 278 extends beyond the edge of the wall 279, and is connected to a supporting block 500. A gap can be selectively sandwiched between the supporting block 500 and the wall 279 for other structure components (such as a back plate or a shell) to extend into. The supporting block 500 connected to the frame 275 can provide sufficient support for the display panel. In this embodiment, the supporting block 500 can be made in one piece with the frame 275, but not limited thereto.

Figure 10A:
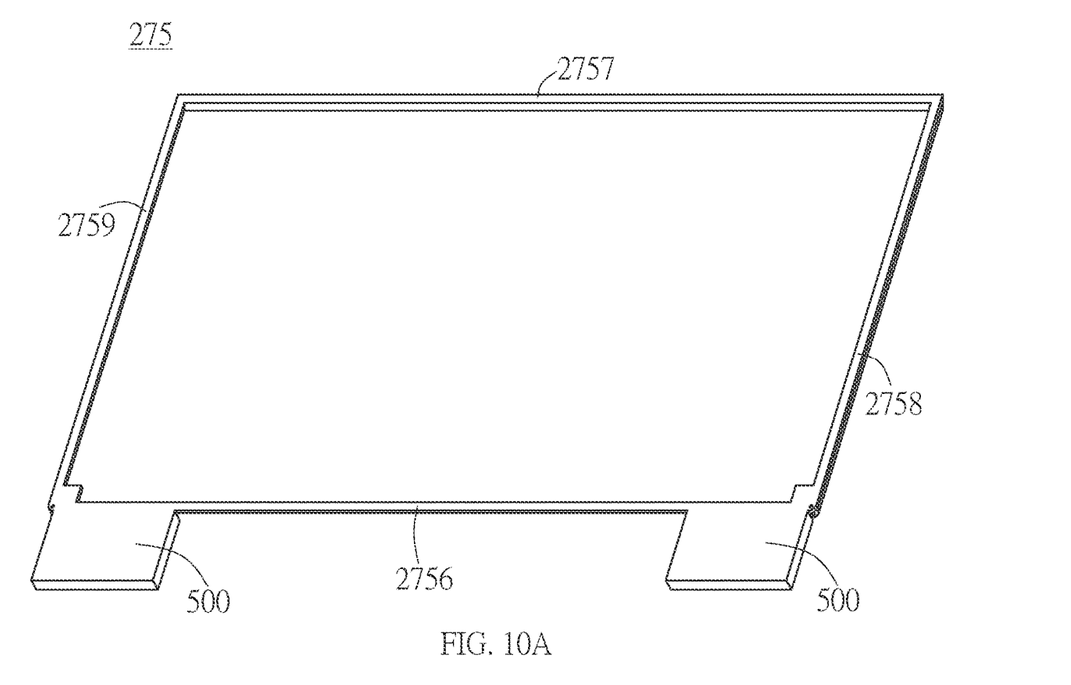
FIG. 10A is a schematic diagram of a frame of a variant embodiment of a display deice.
Figure 10B:
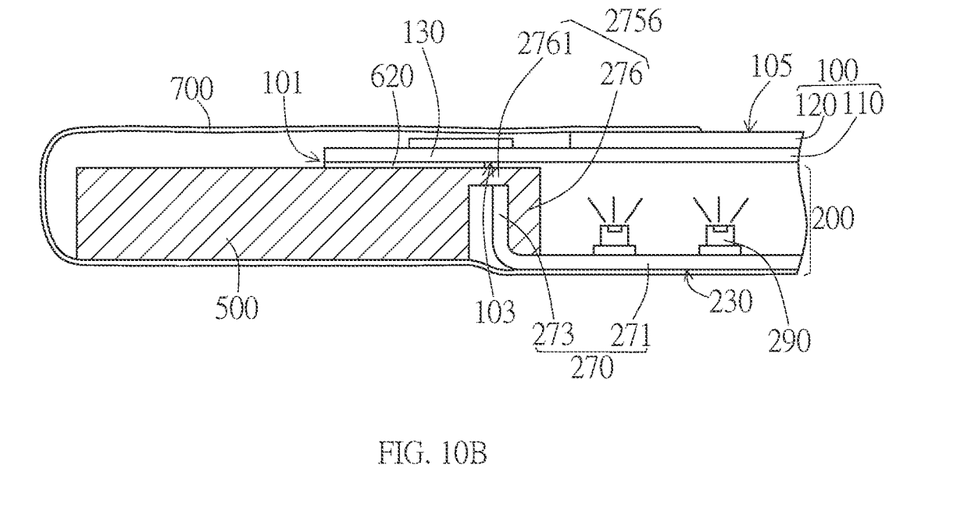
FIG. 10B is a section view of an embodiment of a display deice using the frame shown in FIG. 10A.

As shown in FIG. 10A, in an embodiment of the invention, the frame 275 may include the first border 2756, the second border 2757, the third border 2758 and the fourth border 2759. In this embodiment, the first border 2756 and the third border 2758 are respectively opposite and parallel to the second border 2757 and the fourth border 2759 to form a closed rectangular frame. The supporting block 500 is respectively connected to the first border 2756 near the two ends. FIG. 10B is an embodiment of a display device using the frame 275 shown in FIG. 10A. As shown in FIG. 10B, the display device includes a display panel 100, a circuit connection module 300 and a supporting block 500, and the display panel 100 has a first end 101. In this embodiment, the first border 2756 may, for example, correspond to and be parallel to the first end 101. As shown in FIG. 10A, the first border 2756 includes a wall 276 and a frame roof plate 2761 disposed at the top of the wall 276, and the frame roof plate 2761 protrudes beyond the wall surface of the wall 276 to be connected with the supporting block 500. The side wall 273 of the back plate 270 can extend between the supporting block 500 and the wall 276 to improve the structural stability. With this design, the backlight module can be partially or fully surrounded by the frame 275, and the frame 275 can provide support for the display panel 100. Even for a direct-type backlight module, the supporting block 500 connected to the frame 275 can also provide sufficient support for the display panel 100.

The present invention has been described by the above related embodiments, but the above embodiments are merely examples for implementing the present invention. It is noted that, the disclosed embodiments do not limit the scope of the invention. On the contrary, changes and equivalents included in the spirit and scope of claims are included in the scope of the present invention.

What is claimed is:

1. A display device, comprising:
   a display panel having a first end and a bottom surface;
   a circuit connection module having a connecting end, a circuit bearing portion, and a bending section located between the connecting end and the circuit bearing portion, wherein the connecting end is connected to the display panel at the first end while the bending section bends to make the circuit bearing portion be at least partially connected to the portion of the bottom surface near the first end; and
   a frame at least partially extending to the first end, wherein the frame has a supporting block at least partially connecting to the portion of the bottom surface near the first end, and the supporting block is arranged at a side of the circuit bearing portion in an extending direction of the first end;
   wherein on a projection plane parallel to the bottom surface, the supporting block and the circuit bearing portion are not overlapped with each other, and the supporting block and the circuit bearing portion both are overlapped with the bottom surface of the display panel.

2. The display device according to claim 1, further comprising a backlight module, the backlight module disposed toward the bottom surface;
   wherein the frame is disposed around the backlight module; the circuit bearing portion and the supporting block respectively connect to a portion of the bottom surface protruding from the backlight module.

3. The display device according to claim 2, further comprising a tape, two ends of the tape are respectively attached to the display panel and a back surface of the backlight module;
   wherein the tape covers the circuit connection module from outside.

4. The display device according to claim 3, wherein the tape has a first wrapping portion and a second wrapping portion arranged along the extending direction of the first end, and the first wrapping portion and the second wrapping portion respectively correspond to the circuit bearing portion and the supporting block; and
   a crack exists between the first wrapping portion and the second wrapping portion.

5. The display device according to claim 2, wherein the backlight module comprises:
   a back plate having a bearing plate and a side wall at least partially arranged around the bearing plate, wherein the bottom surface of the display panel is supported by a top of the side wall;

a pad disposed between the top of the side wall and the bottom surface; and a plurality of light sources arranged on the bearing plate.

6. The display device according to claim 1, wherein
the circuit bearing portion has a first lateral end away from the first end;
the supporting block has a second lateral end away from the first end; and
the first lateral end is flush with the second lateral end.

7. The display device according to claim 1, wherein
the circuit bearing portion has a first lateral end away from the first end;
the supporting block has a second lateral end away from the first end; and
the first lateral end protrudes outside the second lateral end.

8. The display device according to claim 1, wherein the supporting block at least partially protrudes outside the first end.

9. The display device according to claim 1, wherein
the display panel has a second end;
the second end is in contact with the first end to form a corner; and
the support block at least partially protrudes from the corner.

10. The display device according to claim 1, wherein
the circuit bearing portion has a first lateral end; and
the first lateral has a recessed portion, and the bending section at least partially locates within the recessed portion and is connected to the circuit bearing portion.

11. The display device according to claim 1, further comprising:
a first adhesive layer and a second adhesive layer respectively disposed between the circuit bearing portion and the bottom surface as well as between the supporting block and the bottom surface;
wherein the first adhesive layer and the second adhesive layer have different thickness.

12. The display device according to claim 1, wherein the frame has a first arm, the first arm has a first free end extending to the first arm, and the first free end includes:
a wall; and
a frame roof plate disposed on top of the wall and protruding beyond the wall and forming the supporting block.

13. The display device according to claim 1, wherein the frame has a first border, the first border corresponds to and is parallel to the first end, and the first border includes:
a wall; and
a frame roof plate disposed on top of the wall and protruding beyond the wall and forming the supporting block.

14. A display device, comprising:
a display panel having a first end and a bottom surface;
a circuit connection module having a connecting end, a circuit bearing portion, and a bending section located between the connecting end and the circuit bearing portion, wherein the connecting end is connected to the display panel at the first end while the bending section bends to make the circuit bearing portion be at least partially connected to the portion of the bottom surface near the first end;
a frame at least partially extending to the first end, wherein the frame has:
a wall; and
a supporting block arranged at a side of the circuit bearing portion in an extending direction of the first end, and at least partially connected to the portion of the bottom surface near the first end, wherein the supporting block has a roof plate at least partially extending to locate at the top of the wall.

15. The display device according to claim 14, further comprising a backlight module, the backlight module disposed toward the bottom surface;
wherein the frame is disposed around the backlight module; the circuit bearing portion and the supporting block respectively connect to a portion of the bottom surface protruding from the backlight module.

16. The display device according to claim 15, further comprising a tape, two ends of the tape are respectively attached to the display panel and a back surface of the backlight module;
wherein the tape covers the circuit connection module from outside.

17. The display device according to claim 16, wherein
the tape has a first wrapping portion and a second wrapping portion arranged along the extending direction of the first end, and the first wrapping portion and the second wrapping portion respectively correspond to the circuit bearing portion and the supporting block; and
a crack exists between the first wrapping portion and the second wrapping portion.

18. The display device according to claim 15, wherein the backlight module comprises:
a back plate having a bearing plate and a side wall at least partially arranged around the bearing plate, wherein the bottom surface of the display panel is supported by a top of the side wall;
a pad disposed between the top of the side wall and the bottom surface; and
a plurality of light sources arranged on the bearing plate.

19. The display device according to claim 14, wherein
the circuit bearing portion has a first lateral end away from the first end;
the supporting block has a second lateral end away from the first end; and
the first lateral end is flush with the second lateral end.

20. The display device according to claim 14, wherein
the circuit bearing portion has a first lateral end away from the first end;
the supporting block has a second lateral end away from the first end; and
the first lateral end protrudes outside the second lateral end.

21. The display device according to claim 14, wherein the supporting block at least partially protrudes outside the first end.

22. The display device according to claim 14, wherein
the display panel has a second end;
the second end is in contact with the first end to form a corner; and
the support block at least partially protrudes from the corner.

23. The display device according to claim 14, wherein
the circuit bearing portion has a first lateral end; and
the first lateral has a recessed portion, and the bending section at least partially locates within the recessed portion and is connected to the circuit bearing portion.

24. The display device according to claim 14, further comprising:
a first adhesive layer and a second adhesive layer respectively disposed between the circuit bearing portion and the bottom surface as well as between the supporting block and the bottom surface;

wherein the first adhesive layer and the second adhesive layer have different thickness.

25. The display device according to claim 14, wherein the frame has a first arm, the first arm has a first free end extending to the first arm, and the first free end includes the wall.

26. The display device according to claim 14, wherein the frame has a first border, the first border corresponds to and is parallel to the first end, and the first border includes the wall.

\* \* \* \* \*